United States Patent [19]

Dickinson

[11] Patent Number: 4,898,107

[45] Date of Patent: Feb. 6, 1990

[54] PRESSURIZED WET COMBUSTION OF WASTES IN THE VAPOR PHASE

[75] Inventor: Norman L. Dickinson, Monte Sereno, Calif.

[73] Assignee: Dipac Associates, Monte Sereno, Calif.

[21] Appl. No.: 294,424

[22] Filed: Jan. 9, 1989

Related U.S. Application Data

[63] Continuation-in-part of Ser. No. 100,531, Sep. 24, 1987, abandoned, which is a continuation-in-part of Ser. No. 813,486, Dec. 26, 1985, Pat. No. 4,714,032.

[51] Int. Cl.⁴ .............................................. F23G 7/04
[52] U.S. Cl. .................................. 110/346; 110/238; 110/347; 60/39.05; 60/39.464
[58] Field of Search ............... 110/238, 346, 347, 348; 60/39.05, 39.464

[56] References Cited

U.S. PATENT DOCUMENTS 4,441,437  4/1984  Moskau ................................. 110/346
4,571,175  2/1986  Bogle et al. ..................... 110/238 X Primary Examiner—Edward G. Favors

[57] ABSTRACT

Liquid wastes and solid wastes, which can be put into slurry form, have combustible constituents burned from them at supercritical temperature and subcritical pressure, with respect to water, resulting in purified water and, with the more concentrated wastes, recovery of valuable energy. Pressure makes possible the recovery of latent heat so that the dry heating value of the waste is made available. Consequently, relatively dilute wastes can be "incinerated" without the consumption of auxiliary fuel.

26 Claims, 4 Drawing Sheets

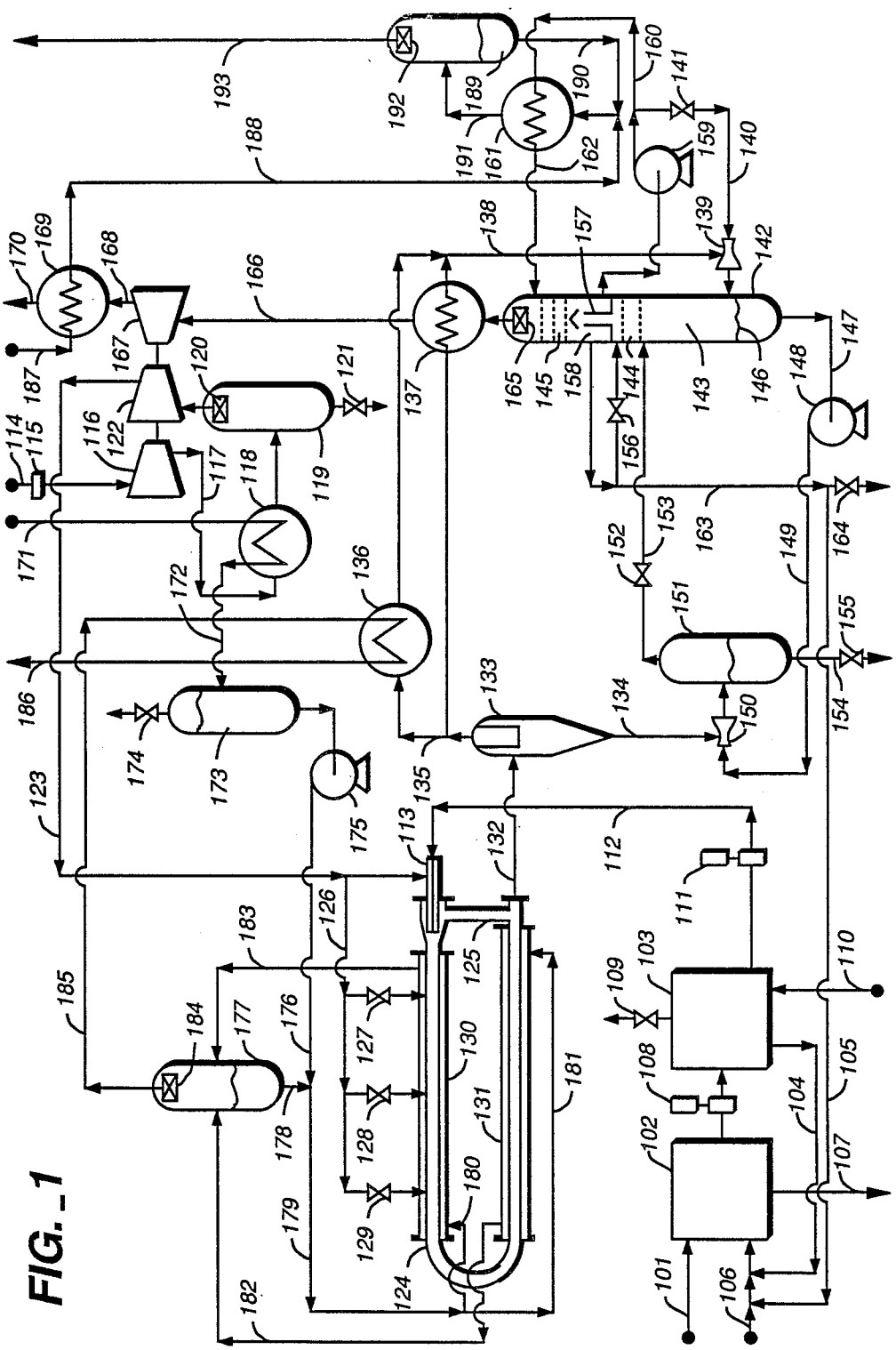
FIG._1

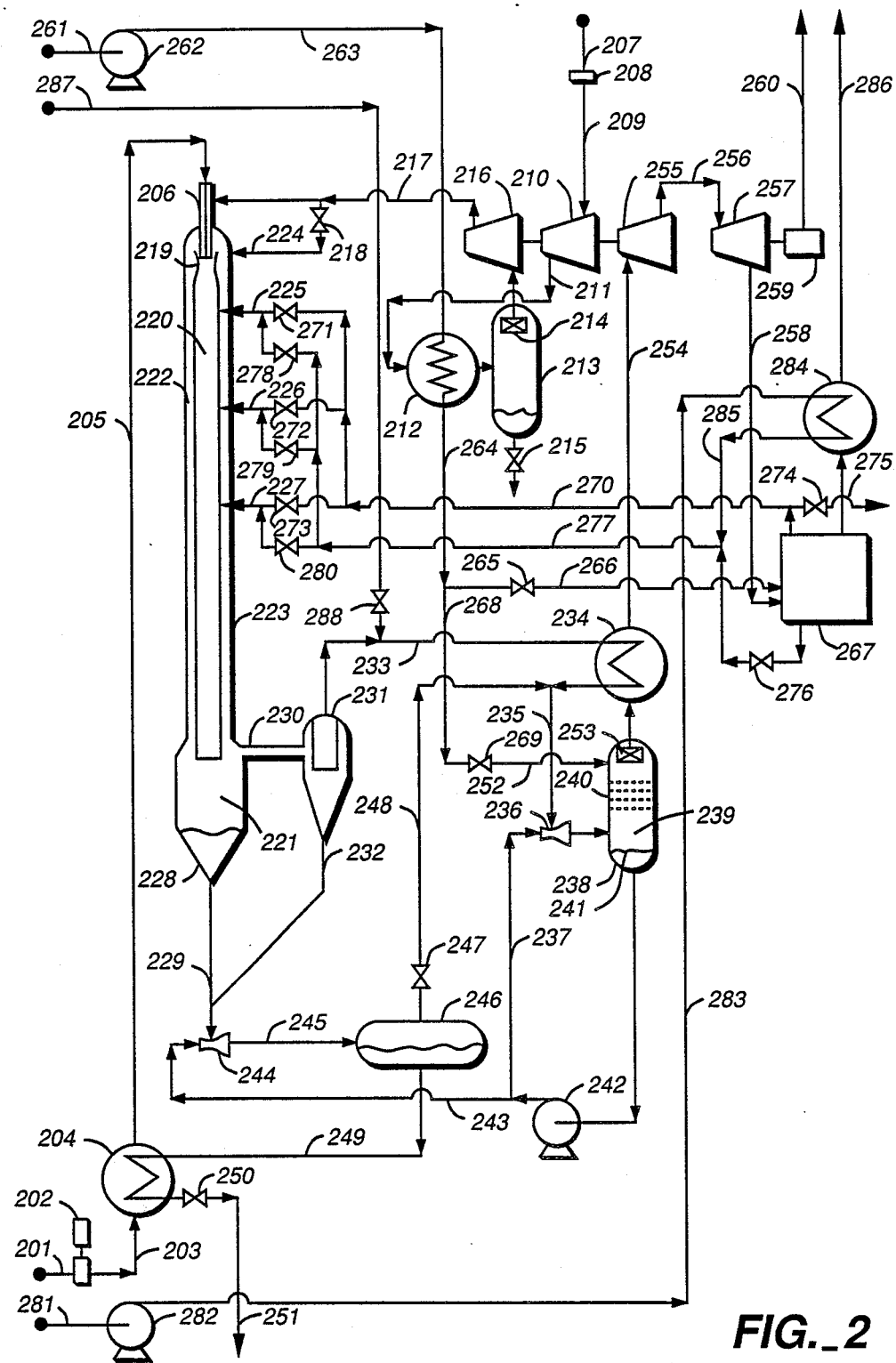
FIG._2

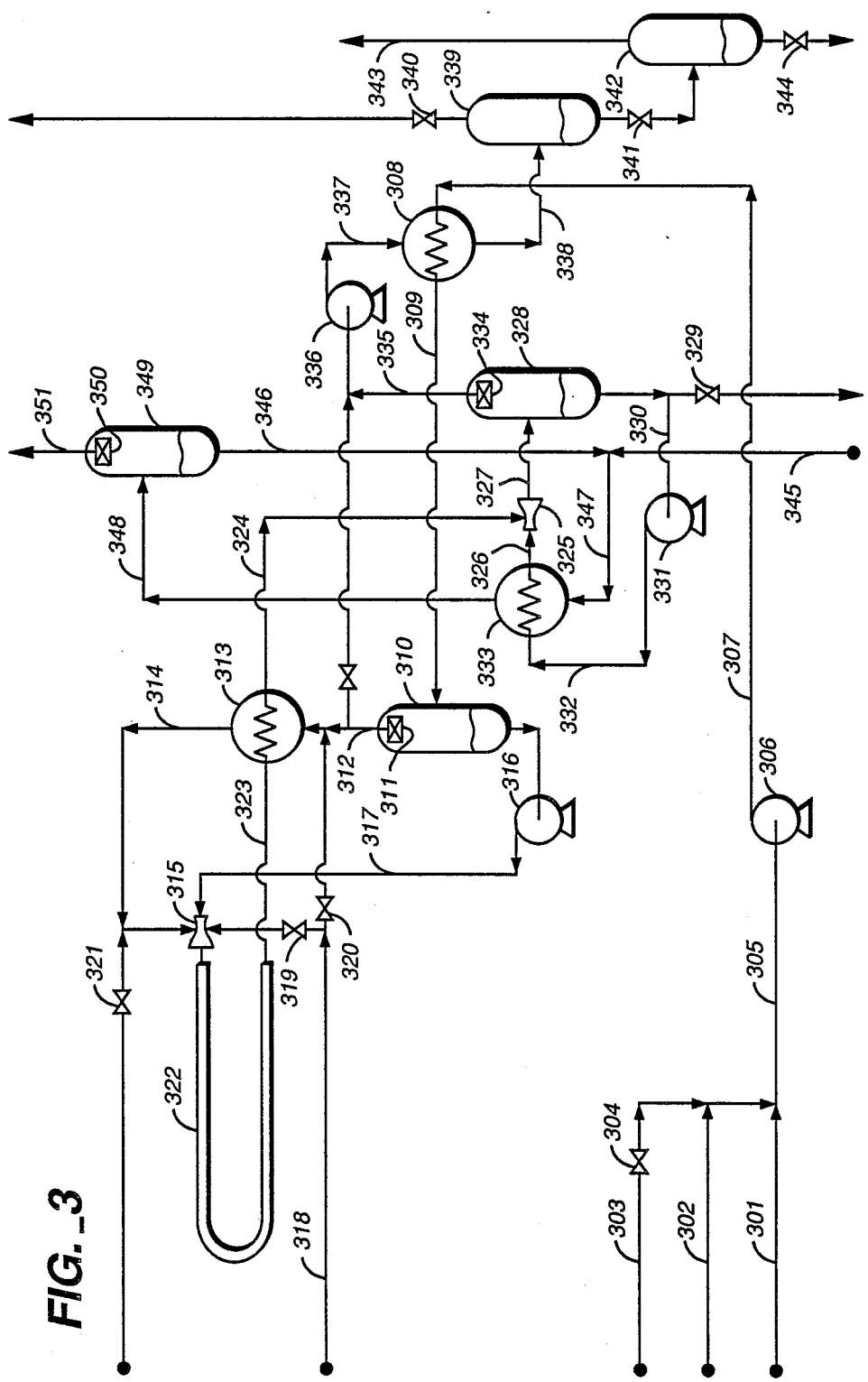
FIG._3

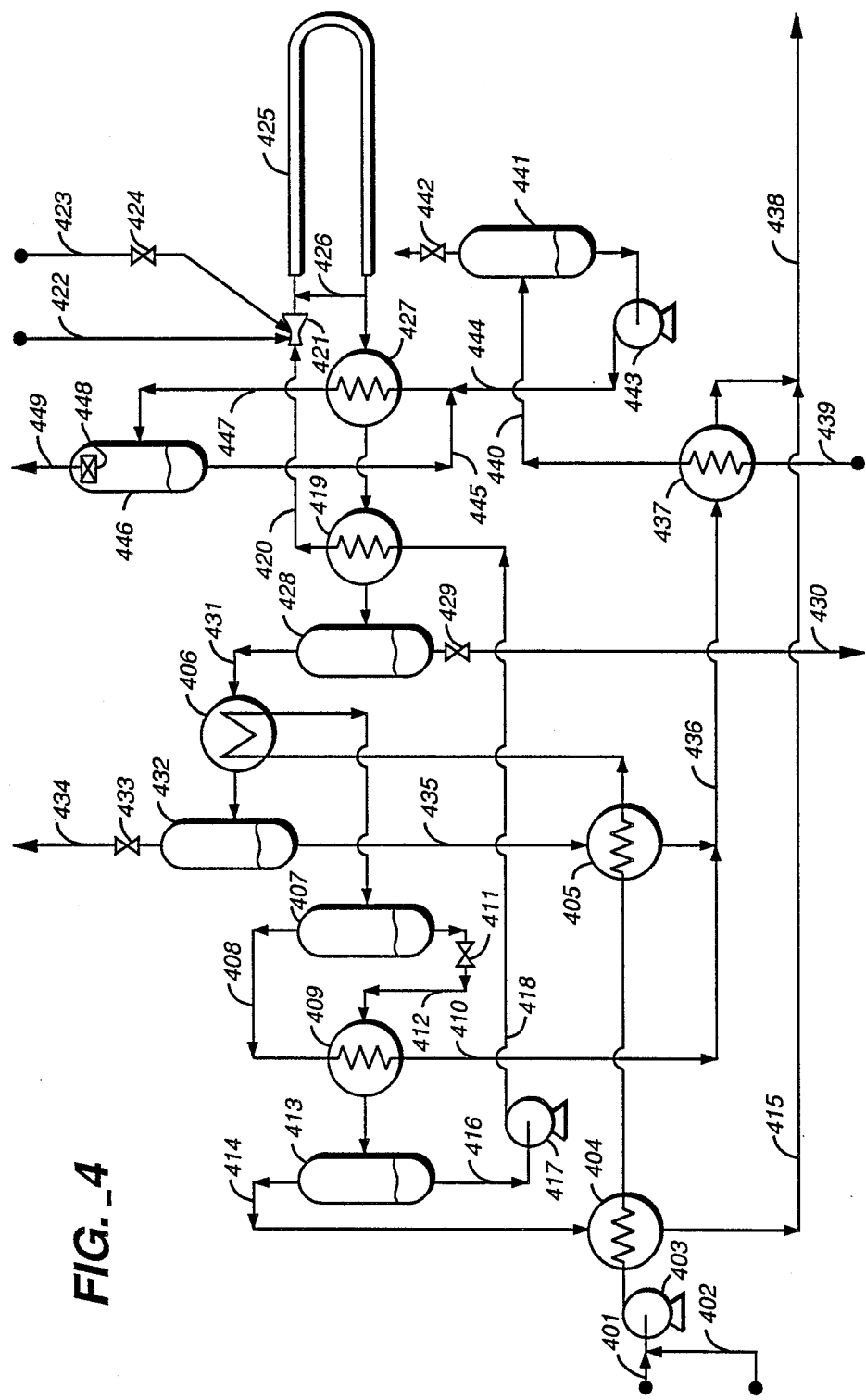
FIG._4

PRESSURIZED WET COMBUSTION OF WASTES IN THE VAPOR PHASE

CROSS-REFERENCE TO RELATED APPLICATIONS

This application is a Continuation-in-Part of co-pending application Ser. No. 100,531, filed Sept. 24, 187 abandoned (parent case) which is itself a Continuation-in-Part of Application Ser. No. 813,486, filed Dec. 26, 1985 (now U.S. Pat. No. 4,714,032) and is cross-referenced to my U.S. Pat. Nos. 4,377,066 (A) and 4,380,960 (B).

BACKGROUND OF THE INVENTION

The United States, with about 5 percent of the world population, consumes about 40 percent of its resources, most of which are used once and discarded. Disposal of the resulting waste material was handled, until fairly recent times, in the simplest possible manner and not looked upon as a serious environmental problem. More recently, growth in both population and consumption per capita have multiplied the production of waste whose environmentally acceptable disposal is compounded by the neglect of the past.

Waste is produced in all the forms of matter: gaseous, liquid and solid. This invention is directed toward the effective disposal of those liquid and solid wastes whose contaminants are predominantly combustible, in many cases with the recovery of valuable energy.

Solid waste is the form currently receiving the most publicity, particularly Municipal Solid Waste (MSW). According to the Environmental Protection Agency (EPA), 157.7 million tons of solid waste were discarded in 1966. Formerly dumped in a convenient open area, or barged to sea, "garbage dumps", upgraded to "landfills", are getting filled up. An April 1987 Worldwatch Institute Study estimated that by 1990 half of U.S. cities will have exhausted their landfills. Owners of landfills which still have capacity are escalating the "tipping fee" they charge for accepting solid waste. The average fee nearly doubled in 2 years, from $19.52 per ton in 1986 to $34.69 in 1988. Buried in these averages are fees as high as $100 per ton in some New England communities. At the same time, the EPA and international agreements have curtailed ocean dumping.

While environmentalists are decrying the diversion of land, the odors and polluted drainage emanating from landfills, conservationists are protesting the waste of natural resources in discarded iron, glass, aluminum and plastics, estimated by EPA to comprise, in 1986, 10.6, 11.8, 1.7, and 10.3 million tons, resp.

Under economic and environmental pressures, municipalities are increasingly turning to methods of burning (incinerating) their MSW, generally with recovery of energy. Slightly over 100 incinerators were in operation at the end of 1988, with 28 under construction and about 200 on the drawing boards. These "Waste-to Energy" projects come in two main forms: "Mass Burn" and "Resource Recovery". In the former, the MSW is burned essentially as received, in atmospheric boilers specially designed to process the often heavy and oddly shaped non-combustible items to an incinerator ash.

Resources Recovery projects, naturally favored by conservationists, process the raw MSW to recover recyclable materials (generally iron, aluminum and glass), the remainder being an improved "Refuse Derived Fuel" (RDF) which can, in many cases, be burned in existing boilers designed for coal. Since RDF has a low density and heating value, and there are other practical disadvantages to substituting it for their usual fuel, utilities are in some cases reluctant, or willing to pay only a heavily discounted price. In other cases, local power-plants are taking steps to utilize the RDF in the interest of helping to solve a common waste problem.

Mass burning projects generally face serious environmental opposition. Nearby residents fear that atmospheric emission regulations (at present limited to particulate matter) and standards of operation do not adequately protect their health. At least 26 toxic pollutants have been identified in incinerator flue gas. Moreover, the unburned residue (roughly 20-30 percent), contains hazardous substances. In EPA tests, every sample of "fly ash" (fine particles recovered from stack gases) contained unacceptable levels of toxic metals, such as lead and cadmium, and "bottom ash" contained unacceptable levels in 10-30 percent of the cases. Landfilling of hazardous ash requires very expensive precautions.

The EPA has announced plans to publish a list of incinerator air pollutants by November 1988 and propose New Source Performance Standards a year later, a regulatory effort which does not satisfy environmentalists nor congress. In the meantime, EPA is requiring new (not existing) incinerators to employ "best available technology", generally interpreted to mean scrubbers of some sort plus a particulate filter or precipitator. Congress, however, was unable to pass in 1988 either the Clean Air Act Amendment or the Resources Conservation and Recovery Act (RCRA). The impasse reflects, to a considerable degree, the difficulty and expense of removing the pollutants from the large volume of flue gas, characteristic of atmospheric pressure combustion.

Burning of RDF, on the other hand, faces comparatively little opposition, in part because it contains less sulfur than the coal for which it is substituted. However, there remains a concern for unquantified new pollutants, such as chlorine compounds, resulting from the substitution.

At the time of this application mass burning accounts for about three-fourths of the waste-to-energy projects but authorities expect the resource recovery alternative to increase its share in the future.

Although quite variable, MSW has a typical heating value of roughly 5000 Btu/Lb., less than half that of a good steam coal. Its comparatively high moisture content (20-35 percent), which must be evaporated in any atmospheric boiler, detracts seriously from the recoverable energy.

Considering its already high moisture and low heating value, it is understandable that most resource recovery units process the MSW dry, utilizing a variety of solids shredding, conveying and separating operations. Early installations encountered difficulties with stalling, clogging, equipment failure, explosions and fires. Labor and maintenance were high and availability low; recovery of recyclable components poorer than expected. With experience, resource recovery operations have improved but remain less economical and dependable than would be desired.

U.S. Pat. No. 4,624,417 (Gangi) describes a wet resource recovery process in which the separations are performed on an aqueous slurry of shredded MSW, in continuous equipment resembling that used to process wood chips to paper pulp. Equipment is said to function more dependably, without fire or explosion hazard. RDF is produced as a wet solid containing about 50 percent water and may be subsequently dried and pelletized to a saleable fuel. Drying and pelletizing adds considerably to the labor, space requirement and expense of the process.

For the atmospheric combustion of a waste to be self-sustaining, i.e., to proceed without the expense of supplemental fuel, it must have a combustible content of about 30 percent. Self-sustaining combustion is not necessarily good enough; the temperature must be sufficiently high to destroy stable pollutants, such as PCBs, furans and dioxin. With air preheat, MSW and RDF can usually attain a satisfactory temperature. To incinerate wastes of lower combustible content, including common aqueous liquid wastes, supplemental fuel is required.

Most solid and many liquid wastes are hydrophilic, i.e., have a natural affinity for water, making them difficult to dry (and keep dry). As a related characteristic, they tend to be fibrous so that considerable water is required to make a fluid (pumpable) slurry with them. "Pumpability" depends somewhat on system and type of pump. It has been variously defined as a maximum viscosity in the range of 500-1000 Centipoises. Typically, the maximum pumpable concentration is roughly 10-15 percent dry solids. Such a slurry would not burn (without supplemental fuel) in an atmospheric boiler but could be made to burn, with the recovery of some energy, under pressure. Even so, heating so much water to combustion temperature is relatively inefficient.

Patent B discloses that a slurry of a hydrophillic fuel can be concentrated by heating it to a temperature at which molecular rearrangement occurs, with evolution of heat and the splitting off of carbon dioxide and water, resulting in a less-hydrophilic and fibrous fuel for which the maximum pumpable solids concentration is considerably increased.

The University of North Dakota Research Center (UNDERC) has carried out a large number of such slurry carbonizations, which they call Hydrothermal Treatment. Most of this work has concerned high moisture fossil fuels occuring in the state, but they have reported that the "energy density" (approximately equivalent to solids concentration) of a slurry of wood fiber has been increased by 300 percent. This means that a slurry which can be pumped up to only about 10 percent concentration can be dewatered, after carbonization, to a pumpable concentration of about 40 percent.

Using EPA figures for 1986, paper and cardboard account for an average 35.6 percent and yard waste another 20.1 percent of discarded solid waste. Adding in wood, textiles, rubber, leather and food wastes, the content of fibrous components comprises about three-quarters of the total. It may therefore be expected that the concentration at which an RDF slurry can be pumped will be increased from about 10-15 to about 35-40 percent by heating to a carbonizing temperature (about 350-550 degrees F.).

Of the major liquid wastes, municipal sewage has had for many years a respectable treatment background. Established methods of biological treatment are comparatively satisfactory, but produce a by-product of sewage sludge whose existing means of disposal (ocean dumping, incineration, landfill and composting) are less acceptable. About 3 million tons per year (about 40 percent of the total) are landfilled. The last congress passed the Ocean Dumping Ban Act of 1988 which seeks to discourage disposal of sewage sludge at sea by making it more expensive, but does not prevent it nor satisfy environmentalists.

Industrial liquid wastes, whose characteristics vary over a broad spectrum are, in some cases, treated effectively and, in other cases, utilize disposal methods (including incineration, ponding, landfill and deep well injection) which are either expensive or controversial. EPA estimated that, in 1987, 60 percent of hazardous waste was being pumped into wells, including over 90 percent of that originating with the organic chemical, petroleum and steel industries. At that time there were 186 such wells in 13 states, with 70 percent of the activity in Texas and Louisiana.

In addition to the well known biological methods, some liquid industrial wastes respond well to treatment with activated carbon and to a molecular filtration known as reverse osmosis. These treatments are practically limited to dilute wastes, generally containing less than about 2 percent organic contaminant.

Solid wastes can, in general, be incinerated (although at low energy efficiency). Dilute non-toxic aqueous wastes have, for the most part, acceptable treatment methods. This leaves, however, a substantial gap encompassing toxic wastes and those with roughly 2 to 30 percent combustible content, for which the known art is relatively unsatisfactory.

Among the wastes falling in this concentration range, the best known is sewage sludge, which has a maximum pumpable solids concentration, depending upon digestion and other treatments, of roughly 10 percent. Others include aqueous wastes from conversions of low rank fossil fuels, such as peat, lignites and sub-bituminous coal, into more marketable higher heating value chars (or the like).

In addition to incineration, patent and technical literature describe two other methods of purifying aqueous wastes by burning combustible impurities from them. Both employ elevated pressures as well as temperatures. The earlier of these methods, known as Wet Air Oxidation (WAO), is licensed by Zimpro, Inc. The second, known as Supercritical Water Oxidation (SCWO), is licensed by Modar, Inc. They are more thermally efficient than incineration because the purified water is discharged in liquid state, conserving its latent heat. Consequently, the combustible concentration at which they can be self-sufficient in energy is much lower than with atmospheric combustions. Also, the flue gas is ordinarily free of pollutants and requires little or no treatment.

WAO oxidizes combustible impurities from aqueous wastes, imposing sufficient pressure to maintain them in liquid phase at temperatures which generally range from 400-650 F. SCWO oxididizes the impurities at temperatures and pressures above water's critical of 705.4 F. and 3200 psi. While both methods are effective, they require expensive equipment, suitable for pressures generally in the range of 2000-4000 psi.

SUMMARY OF THE INVENTION

Destruction of wastes by incineration (at atmospheric pressure) and liquid phase oxidations (at elevated pressure) have long histories. More recently, pressurized oxidation of liquid wastes was extended into the supercritical region. Unrecognized are the advantages of a waste oxidation regime which is supercritical in temperature but between atmospheric and critical in pressure. I have discovered that combustible impurities in aqueous wastes, and solid wastes which can be put into the form of an aqueous slurry, can be effectively and efficiently destroyed by combustion (oxidation) at supercritical temperatures and subcritical pressures. Unlike with atmospheric incinerators and boilers, water accompanying the waste is recovered in liquid form, saving its comparatively large latent heat of vaporization. The vent (or "flue") gases usually meet emissions standards without added control devices.

All combustions are exothermic. By careful conservation of combustion heat, wastes containing as little as about 1-2 percent combustible matter can be purified (even those more dilute with the addition of supplemental fuel). When the combustible content exceeds about 3-4 percent it is feasible to recover useful energy in the form of steam. With combustible contents greater than about 15 percent it is feasible for the combustion to produce a hot gas-steam mixture which can drive a gas turbine generator capable of turning a respectable part of the combustion heat directly into electricity, with or without the coproduction of steam.

With the more concentrated wastes, the oxidant of choice is usually air. With dilute wastes, commercial oxygen may be more attractive, particularly when an advantageous purchase agreement can be negotiated.

The alkali content of the liquid charge, whether dilute or a comparatively viscous slurry, is generally adjusted to a level sufficient to maintain a neutral or alkaline pH (i.e., 7 or higher) in downstream equipment (pH being the recognized measure of acidity or alkalinity). Ground lime limestone or dolomite is the alkali usually added. The charge is pumped, preheated and charged, along with combustion air (or other oxygen-containing gas), to a pressurized combustion zone maintained at a temperature above the critical temperature of water (705.4 degrees F.), the preferred range for boiler embodiments being 1200-1600 degrees and for gas turbine embodiments 1600-2500 degrees. Pressure may range from about 100 pounds per square inch guage (psig) to the critical pressure of about 3200 psig, the preferred range being about 150 to 1000 psig.

The heat of combustion of a comparatively dilute waste may be sufficient only to heat the products to the desired combustion temperature. More concentrated wastes yield an excess of heat which must be absorbed, to avoid temperatures higher than preferred, either by heat transfer (as to boiling feedwater) or by the latent heat of additional water or aqueous waste injected into the combustion zone, or by a combination of both methods.

When the contaminants of a dilute liquid waste are substantially less volatile than water, it is feasible to concentrate it by known methods of multiple-effect, multi-stage flash or vapor recompression evaporation, the evaporated water being a purified product. Pressurized wet combustion of the concentrate supplies the heat required for the concentration.

If its ash content warrants, effluent from the combustion zone may discharge into a gas-solids separator. Solid products may be withdrawn from the pressurized apparatus by means of a plurality of lock hoppers, according to known art. A preferred method comprises mixing the pressurized solids with aqueous condensate from downstream portions of the apparatus, which displaces gases accompanying the dry solids, the gases remaining in the pressurized apparatus, before depressurizing the resulting ash slurry. With wastes of low ash content the solids separation steps may be omitted.

Higher level heat in hot gaseous products may be transferred for such purposes as superheating steam, reheating flue gas, generating steam and, in some cases, preheating combustion air. It is characteristics of all embodiments that, in the latter stages of heat recovery, the dewpoint is reached and liquid water condenses from combustion products. Fine solid particles (fines) and vaporized salts, remaining with the gases, are wetted and transferred to the aqueous phase.

In boiler embodiments, gaseous products are further cooled and dried by indirect exchange, as by dehydrated flue gas, boiler feedwater or aqueous waste destined for reactor temperature control, and/or by direct contact with circulating water. (Heat so transferred to the water may be similarly utilized.) That condensed from gaseous products is distillation-purified and may be withdrawn and utilized for any purpose requiring water of good quality. Except with comparatively dilute wastes, reheated flue gas is expanded through turbines which provide at least part of the energy to pressurize the oxidant.

Energy production may be primarily as superheated and/or saturated steam or, alternatively, some of the combustion heat may be employed to reheat flue gas to a temperature such that the turbines yield a surplus of power for export.

Although described with reference to RDF and dilute aqueous wastes, the practice of my invention embraces the conversion to carbon dioxide, water and thermal energy of all forms of waste or by-product carbonaceous materials which can be put into slurry form including, but not limited to, petroleum coke, char, forestry and agricultural by-products, and fuels of vegetable or organic origin known collectively as "biomass", whether or not energy is recovered.

An object of the invention is to provide an improved means of disposing of liquid and solid wastes. Another object is to improve the efficiency and economy of recovering energy from wastes and other high moisture fuels. Another object is to decrease the pollution of the earth's atmosphere. A further object is to curtail the contamination of the nation's groundwater. A further object is the reclamation of fresh water for re-use. Additional objects will be apparent from a consideration of the drawings and explanations thereof.

BRIEF DESCRIPTION OF THE DRAWINGS

FIG. 1 is a schematic elevational diagram of a boiler embodiment of the invention capable of recovering with high thermal efficiency, the dry heating value of Municipal Solid Waste, and similar wastes, in the form of steam.

FIG. 2 is a schematic elevational diagram of a gas turbine embodiment capable of recovering with high thermal efficiency, the dry heating value of Municipal Solid Waste, and similar wastes, in the form of electricity and, optionally, steam.

FIG. 3 is a schematic elevational diagram of an embodiment capable of purifying a dilute waste of combustible contaminants by converting them to carbon dioxide and water.

FIG. 4 is a schematic elevational diagram of an embodiment which purifies a dilute waste by concentrating it through multiple-effect evaporation with heat derived from the combustion of the concentrate.

DESCRIPTION OF PREFERRED EMBODIMENTS

With reference to FIG. 1, Municipal Solid Waste (MSW) is transported by a conveyor 101 to a wet-type Resource Recovery unit 102 in which it is shredded and slurried in water recycled from a carbonization unit 103 through a line 104 and/or reclaimed water returned to the unit 102 via a line 105. Any defficiency of recycled and/or reclaimed water is made up by supplying make-up water through a line 106. Recyclable inorganic constituents, such as iron, aluminum and glass, are separated in the unit 102 from the shredded and slurried MSW and removed from the apparatus by a transport means 107. The resulting dilute slurry of organic constituents is dewatered, within the unit 102, to about the maximum pumpable solids concentration by the separation and internal recycle of part of its water (primary recycle).

A RDF slurry pump 108 provides sufficient pressure to move the dewatered slurry to, and maintain it in liquid state in, the slurry decarbonization unit 103 in which it is heated to a temperature, preferably in the range of about 350–550 degrees, at which a substantial portion of the organic constituents undergo a molecular rearrangement, with the evolution of heat and the splitting off of carbon dioxide and water. The evolved gases, along with an equilibrium concentration of steam, are vented through a valve 109. This rearrangement, or carbonization, results in a slurry of carbonized RDF which is appreciably less hydrophilic and can therefore be dewatered to a pumpable slurry of increased solids concentration. The water separated in this second dewatering, within the carbonization unit 103, (freed water) is recycled hot to the resource recovery unit 102 via the line 104.

The carbonizing reactions also produce some water soluble organic compounds. Some of these are recycled with the freed water to the unit 102 but do not interfere with its proper operation. (They are eventually purged through the combustion system in which they are converted to carbon dioxide and water along with combustible solids.)

The heat of carbonization is sufficient in some cases that, with efficient exchange of heat between incoming and outgoing streams, the operation can be energy self-sufficient. In other cases it is preferable or more economical to heat the RDF slurry to carbonization temperature, at least in part, by injecting steam from the associated combustion (connection not shown). In the latter cases, carbonized slurry and recycle water are available at a higher temperature.

Although the RDF has been shredded and pulped as part of the wet resource recovery operation, it may be desirable, in the interest of improved dispersion and carbon conversion in the subsequent combustion, to further reduce the particle size of the carbonized RDF, by means of a wet grinding (not shown). Carbonization embrittles the RDF fibers, improving their "grindability". The grinding may precede, or follow, the dewatering of the carbonized slurry.

MSWs have a variable content of sulfur, chlorine, phosphorus and/or other anions which can oxidixe to inorganic acids during combustion. In order to protect equipment and avoid the possible discharge of acid gases, an alkali, such as a slurry of ground limestone or dolomite, is injected through a line 110 into the RDF slurry being processed. This injection may occur either before or after carbonization and dewatering.

A fuel slurry charge pump 111 draws the resulting alkalized concentrated carbonized slurry from the system 103 and provides sufficient pressure to cause it to flow, via a line 112, to a an air-slurry mixer 113. (The pumps 108 and 111 are illustrated as of reciprocating type, but other types suitable for pumping viscous slurries, such as the progressing cavity type, can be used.)

Atmospheric air is drawn through a conduit 114 and a conventional filter 115 (to protect the apparatus from airborne solids) to the suction of a first stage air compressor 116, which delivers it hot and at an elevated pressure through a line 117 to an intercooler 118, in which it is cooled by indirect exchange with boiler feedwater.

Atmospheric air contains a variable amount of water vapor (humidity). Most of the water vapor contained in the air drawn into the apparatus condenses to liquid water in the intercooler 118 and is discharged with the cooled air into a a second stage compressor suction drum 119 containing a mist extractor 120, in which it is separated and removed from the apparatus through a valve 121.

From the mist extractor 120 the partially compressed air flows to the suction of a second stage air compressor 122 which delivers it hot and at a further increased pressure through a line 123 to the air-slurry mixer 113.

(Although the small stream of gas vented through the valve 109 comprises predominantly carbon dioxide and steam, if judged to contain appreciable air pollutants, it may be incinerated, as by conducting, by means of a line not shown, to, for example, the line 114 or the line 117.)

Fuel slurry and air are intimately mixed in, and/or immediately after leaving, the mixer 113 and discharge at comparatively high velocity into the entrance of an entrained phase reaction tube 124, which may be narrowed to form a venturi.

In the reactor embodiment of FIG. 1, the reaction tube 124 is in the shape of an U-tube, its discharge end being proximate to its entrance to which it is connected by means of a recycle passage 125. According to Bernoulli's well-known theorem, the mass velocity of the fuel slurry and air creates a zone of reduced pressure in the entrance which draws hot combustion products from the discharge zone of the reaction tube 124 through the recycle passage 125 to mix with the discharge of the mixer 113 under the turbulent conditions existing immediately downstream. The heat content of recycled combustion products vaporizes the fuel slurry water and raises the temperature of the resulting air-steam-solids mixture so that combustion reactions are initiated.

Air supplied to the mixer 113 may be divided between primary and secondary passages which may contain swirl baffles and/or other mixing and dispersing means known to the arts of mixer, burner, and/or spray drier design. The mixer 113 may also be equipped with injection or atomizing devices for auxiliary gas or liquid fuel, and an ignition device (not shown) useful or necessary for starting up the reaction system from a cold start.

Secondary (or tertiary) air may also be supplied from the line 123 via the recycle in the passage 125 by means of a connection not shown. Because the reactivity of carbonized RDFs, and other similar fuels, differ, additional inlets for secondary (or tertiary) air are provided via a line 126 and connections regulated by control means 127, 128 and 129. By diverting combustion air from the mixer to one or more of the downstream connections, any excessive heat release in the inlet region can be redistributed further along the tube 124. So staging the introduction of combustion air also minimizes the formation of nitrogen oxides.

The temperature in the reaction tube 124 is controlled within a predetermined maximum by the transfer of heat of combustion through its walls to feedwater boiling in annular spaces 130 and 131. (In order that there be sufficient heat transfer surface for this purpose, the assembly comprising items 113 through 131 may be divided into two or more parallel units).

Upon reaching the outlet of the reaction tube 124, net combustion products flow through a line 132 to a gas-solids separating device 133 illustrated as, but not necessarily, of cyclone type. In the device 133 most of the solid particles in the effluent disengage from gaseous products and fall by gravity into a dipleg 134.

As an alternative to recycling total combustion products from the outlet zone of the tube 124 (as shown), the recycle passage 125 may draw hot gaseous products from the top of the separating device 133.

Gaseous products, containing only unseparated fine solid particles (fines), flow from the separating device 133 via a manifold 135 to a steam superheat exchanger 136 and a reheat exchanger 137, in which they indirectly transfer heat to high pressure steam and dried flue gas, respectively. Having been partially cooled in the exchangers 136 and 137, gaseous products are recombined in a manifold 138 and flow to a a mixer 139 illustrated as, but not necessarily, of venturi type. In the mixer 139 the gaseous products are cooled below their dewpoint by intimate direct contact with a stream of fines slurry from a line 140. Entrained fines are wetted and transferred to the aqueous phase.

The flow of fines slurry in the line 140 is regulated by a control means 141 so that only sufficient water is condensed from the gaseous products to adequately remove fines and vaporized salts therefrom, and provide sufficient liquid medium to slurry the net production of solid products to be withdrawn from the pressurized portion of the apparatus.

From the mixer 139 the mixture of uncondensed gaseous products (containing considerable steam) and fines slurry flow to a separating and condensing vessel 142, comprising a separating zone 143, entrainment removal trays 144 and a condensing section 145 containing a plurality of vapor-liquid contacting elements. In the separating zone 143, fines slurry disengages from gaseous phase and collects in the bottom, forming a fines slurry level 146. This level is held within the proper operating range by withdrawing the net fines slurry production through a line 147, a fines slurry pump 148 and a line 149 to an eductor 150, to which is also directed the net production of ash and spent alkali carried by the dipleg 134 (which may contain a fluidized solids control device, not shown).

The eductor 150 mixes the dilute fines slurry with the ash and spent alkali, which also carry with them gases which characteristically accompany fluidized solids. The heat content of the ash converts an appreciable portion of the slurry water to steam. The gas-steam mixture flows with the combined slurry to an ash slurry deaeration drum 151. In the drum 151 gravity causes the gas and steam to disengage from the liquid slurry and form a continuous phase in the upper part of the drum 151, from which they are vented, under control of a vent valve 152 and via a line 153, to a suitable point in the heat recovery section of the apparatus, such as to the upper part of the separating zone 143. The contained steam comprises a means of recovering useful heat from the hot ash.

Ash slurry, from which gas bubbles have been largely disengaged, leaves the deaeration drum 151 via a line 154. The level in the drum 151 is controlled, and proper pressure in the ash slurrying and deareation apparatus maintained, by a pressure reducing device 155, which discharges depressured ash slurry for offsite disposal. In some cases the heat content of the discharged slurry may warrant recovery as by indirect transfer to boiler feedwater (in an exchanger not shown). Part of the ash slurry may be recycled to the unit 102 as a source of MSW slurrying water and/or to improve the recovery of recycleable inorganic constituents (connection not shown).

The gaseous phase separated from fines slurry leaves the separating zone 143 through the entraiment removal trays 144, which are washed by a small flow of condensate under control of a valve 156, which frees it of traces of entrained slurry before passing through a chimney 157 into the condensing section 145. While rising through the condensing section 145 the gaseous phase is contacted by a counter-current flow of recirculated cooled condensate which condenses from it much of the steam it previously contained.

Recirculated and condensed condensate collects in a sump 158 in the bottom of the condensing section 145 from which it is drawn by a circulating pump 159 and the recirculated position discharged through a line 160. A small part of the condensate from the pump 159 is diverted through the control means 141 as previously described. Another part may be diverted as wash water to the valve 156, in place of the gravity connection shown.

The remainder flows to a slurry boiler 161 in which it is cooled by indirect transfer of heat to boiling feedwater and then returned through a line 162 to the top of the condensing section 145 as reflux. The cooled condensate flows downward through the contacting means in the section 145, counter-current to the upflowing gaseous phase from which it condenses a major portion of its steam content. The net production of condensate is withdrawn from the sump 158 through a line 163.

In some cases the quench in the line 140 may comprise, wholly or in part, cooled condensate from the line 162.

A portion of the condensate in the line 163 is diverted through the valve 156 as previously described. The remainder may be recycled through the line 105 to the unit 102, any surplus being discharged from the unit through the valve 164 as a distillation purified water of good quality.

Cooled and dried flue gas leaves the top of the section 145 through a mist extractor 165, to free it of entrained water droplets, and is conducted to be indirectly reheated by hot gaseous products in the exchanger 137. (In some cases, the flue gas may first be partially reheated by indirect exchange with partially cooled combustion products by means of an exchanger (not shown) in the manifold 138.) The reheated flue gas is delivered through a line 166 to be expanded through a flue gas turbine 167 which delivers mechanical energy, in the form of shaft horsepower, to the first and second stage air compressors 116 and 122.

Having been partly cooled by giving up energy in the turbine 167, the expanded flue gas, now at a pressure only slightly above atmospheric, flows via a conduit 168 to an economizer exchanger 169 in which part of its remaining sensible heat is indirectly transferred to boiler feedwater. The fully cooled flue gas is then discharged to the atmosphere through a conduit 170. In some cases, the exchanger 169 may not be economically justified and therefore omitted.

Boiler feedwater is supplied from outside the apparatus, under pressure from an off-site pump, through a line 171, to the cold side of the intercooler 118 in which it is heated by indirect transfer from partially compressed air. The heated feedwater then flows via a line 172 to a feedwater accumulator 173. In the accumulator 173 (which may be a "deaerator" of proprietary design) formerly dissolved gases, liberated by the heating, may be separated and vented through a valve 174.

A boiler feedwater pump 175 takes suction from the lower part of the accumulator 173 and provides sufficient pressure to cause the preheated feedwater to flow through a line 176 to a point of junction with feedwater recirculated from a high pressure steam drum 177 via a line 178. The combined feedwater stream in a line 179 divides, part comprising, through a line 180, the cooling medium to the jacket 130 surrounding the upstream portion of the U-shaped combustion tube 124, and part, through a line 181, the cooling medium to the jacket 131 surrounding the downstream portion of the tube 124. Indirect transfer of heat of combustion partially vaporizes the feedwater in the jackets 130 and 131, the resulting steam-water mixtures flowing via a line 182 and a line 183 to the drum 177.

In the drum 177 steam is separated from water and leaves through a mist extractor 184, which purifies it of entrained droplets before flowing through a line 185 to the steam superheat exchanger 136, in which it is superheated by indirect transfer from hot gaseous combustion products before leaving the apparatus through a line 186 as the main energy product of the apparatus.

Dissolved solids brought into the apparatus with the cold feedwater tend to accumulate in the water in the drum 177 and have to be purged from the system through a blowdown connection (not shown). Blowdown water is suitable for low pressure feedwater and/or make-up to the unit 102.

Low pressure boiler feedwater is brought into the apparatus, under pressure from an offsite pump, through a line 187 and flows to the economizer 169 in which it is preheated by indirect transfer of heat from turbine exhaust. The preheated feedwater then flows through a line 188 to a point of junction with feedwater recirculated through a line 190 from a low pressure steam drum 189. The combined feedwater stream serves as cooling medium in the slurry boiler 161. Indirect transfer of heat from recirculating condensate in the boiler 161 converts a portion of the feedwater to steam. The resulting steam-water mixture flows to the drum 189 in which it is separated, the water recirculating through the line 190 and the steam passing through a mist extractor 192, to free it of entrained water droplets, before being discharged from the apparatus through a line 193 as a secondary energy product.

Flue gas may be heated in the exchanger 137 to a temperature such that the turbine 167 produces exactly as much power as required by the compressors 116 and 122. Alternatively, flue gas may be reheated to a temperature higher than required to balance turbine and compressor horsepowers. In such case, the turbine 167 (or a separate turbogenerator, not shown, in series or parallel with it) produce excess mechanical energy convertable into electricity, delivered as an optional energy product.

FIG. 1 illustrates the use of aviation-derived turbomachinery in which a single turbine drives first and second stage air compressors. It would have been feasible to substitute industrial (or heavy duty) turbines and compressors in which case each compressor stage would probably, but not necessarily, be paired with its own turbine stage. Comparatively low pressure embodiments may have but one stage of compression and expansion. With internal cooling by condensate injection, a single compressor can be made to deliver combustion air at a pressure which would otherwise have required two or more stages.

Optimum arrangement of heat recovery apparatus may vary from case to case.

With reference to FIG. 2, an alkalized concentrated slurry of precarbonized waste-derived fuel, comparable to that leaving unit 103 of FIG. 1, is supplied through a line 201 to a fuel slurry charge pump 202, which provides sufficient pressure to cause it to flow through a line 203, a slurry preheat exchanger 204 and a line 205 to an air-slurry mixer 206.

Atmospheric air is drawn through a conduit 207 and a conventional filter 208 (to protect the apparatus from airborne solids) via a conduit 209 to the suction of a first stage air compressor 210 of an aircraftderived gas turbine set, which delivers it hot and at an elevated pressure through a line 211 to an intercooler 212, in which it is cooled by indirect exchange with boiler feedwater.

Atmospheric air contains a variable amount of water vapor (humidity). Most of the water vapor contained in the air drawn into the apparatus condenses to liquid water in the intercooler 212 and is discharged with the cooled air into a second stage compressor suction drum 213 equipped with a mist extractor 214, which serve to separate the water from the compressed air so that it may be discharged through the valve 215. (A direct contact intercooler can be used in place of the indirect intercooler 212, or the partially compressed air can be cooled by the evaporation of injected condensate.)

From the mist extractor 214 the cooled partially compressed air flows to the suction of a second stage air compressor 216 which delivers it hot and at a further increased pressure through a line 217 to the airfuel slurry mixer 206.

Fuel slurry and air are mixed in, and/or immediately after leaving, the mixer 206 and discharge at comparatively high velocity, through the throat of a venturi 219, into an elongated reaction tube 220. According to Bernoulli's well-known theorem, the mass velocity of fuel slurry and air creates a zone of reduced pressure in the venturi 219 which draws hot combustion products from a disengaging zone 221, through an annular passage 222, to mix with the discharge from the mixer 206, under the turbulent conditions existing immediately downstream. The heat content of the recycled combustion products vaporizes the fuel slurry water and raises the temperature of the resulting air-stream-solids mixture so that combustion reactions are initiated.

(Although the venturi 219 serves to illustrate the principle employed to establish circulation of combustion products, in practice the mixer 206 may occupy a sufficient proportion of the cross-sectional area of the tube 220 to induce an adequate recirculation without narrowing its upper extremity into a defined venturi.)

Forming the outer wall of the recycle passage 222, and containing the pressure of the reaction apparatus, is a steel reactor shell 223, protected by an insulating refractory lining (not shown).

(The wall separating the reaction tube 220 from the annular passage 222 must withstand a high temperature environment and may, therefore, be constructed of suitable ceramic, ceramet or composite material and/or, particularly if constructed of metal alloy, be equipped for cooling by air, steam or condensate. As a mechanically less difficult alternative, the narrow portion of the refractory-lined shell 223 may be constructed in the shape of a vertical U-tube, the recycle passage 223 being replaced by a short refractory-lined external connection between the top of the disengaging zone 221 and the venturi 219.)

Air supplied to the mixer 206 may be divided between primary and secondary passages which may contain swirl baffles and/or other mixing and dispersion means known to the arts of mixer, burner and/or spray drier design. The mixer 206 may also be equipped with injection or atomizing devices for auxiliary gas or liquid fuel, and an ignition device, (not shown) useful or necessary for heating up the reaction system from a cold start.

Secondary (or tertiary) air may also be supplied from the line 217 via the combustion products recycle through a valve 218 and a connection 224.

As the air-steam-solids mixture flows downward in the tube 220, under turbulent conditions, fuel particles react with oxygen to release heat of combustion, causing the temperature to rise. This temperature is controlled below a predetermined maximum by the injection of preheated water or aqueous waste and/or steam through connectors 225, 226 and/or 227. The number and location of injection points is diagramatic. In practice more, or fewer, points may be specified. Although mixing devices can be used, they are not normally required because of the turbulence in the tube 220.

Gas turbine combustors conventionally operate with at least 100 percent excess air, and sometimes as much as 300 percent. Because temperature in my combustion is controlled by injection of water and/or steam, I prefer to carry out the combustion with only about 10–100 percent excess air, proportionately increasing the fuel energy which can be released, and recovered, from a given amount of compressed air.

During the time provided in the tube 220, conversion of combustible material in the fuel and injected waste (if any), including hazardous compounds such as dioxin, to carbon dioxide and water is essentially complete, the resulting combustion products being discharged into the disengaging zone 221. In the zone 221, the inertia of unburned solid particles, together with the force of gravity, causes most of the solid products to disengage from gaseous products and fall to a conical bottom section 228, from which they are withdrawn through a conduit 229. Although not shown, the conical section 228 may be equipped with aeration connections, through which air and/or steam may be injected to insure that the solids collected therein remain in free-flowing (fluidized) condition. The quantity of fluidizing air and/or steam may be sufficient to cool the particles so as to minimize sticking or agglomerization.

Gaseous products, still carrying unseparated solid particles, reverse direction and leave the top of the disengaging zone 221, part to be recycled through the annular passage 222 and the remainder (net production) leaving reaction system through the a line 230. Because of its content of entrained fine particles it may be subjected to a further gas-solids separation in a device 231 illustrated as, but not necessarily, a cyclone separator. Fine solids separated in the device 231 flow through a dipleg 232 to join with the solids leaving the disengaging zone 221 in the line 229.

Gaseous products, containing only fine solid particles unseparated by the device 231 (fines), leave the reaction system through a line 233 which conducts them to a reheat exchanger 234. In the exchanger 234 the gaseous products are cooled to a temperature somewhat above their dewpoint by indirect transfer of heat to a washed gas-steam mixture.

The partially cooled gaseous products then flow via a line 235 to a vapor-liquid mixer, 236, illustrates as, but necessarily of, venturi type, in which they are intimately contacted with a recirculating stream of hot fines slurry from a line 237. The fines slurry quenches the partially cooled combustion products to a temperature below their dewpoint. Entrained fines are wetted and transferred to the aqueous phase.

The mixture of uncondensed gaseous products (containing considerable steam) and fines slurry flow to a fines separator 238, comprising a separating zone 239, and a plurality of entrainment washing elements or trays, 240. In the separating zone 239, fines slurry disengages from gaseous phase and collects in the bottom section, forming a fines slurry level 241.

A fines slurry pump 242 takes suction from the bottom of the separator 238 and discharges the hot slurry through the line 237 to the mixer 236. In some cases it is necessary or desirable to cool the slurry in the line 237 by indirect exchange with injection water or aqueous waste or boiler feedwater, by means of a heat exchanger not shown.

The fines slurry level 241 is held within the proper operating range by withdrawing the net fines slurry production through a line 243 to an ash eductor 244 to which is also directed the production of ash and spent alkali from the line 229 and the dipleg 232. Either the line 229 or the dipleg 232, or both, may contain a fluidized solids control device (not shown).

The eductor 244 mixes the dilute fines slurry with the ash and spent alkali particles, which also carry with them gases which characteristically accompany fluidized solids. The heat content of the ash converts an appreciable portion of the slurry water to steam. The gas-steam mixture flows with the slurry through a line 245 to an ash slurry deaeration drum 246. In the drum 246 gravity causes the gas and steam to disengage from the liquid slurry and form a continuous gaseous phase in the upper part of the drum 246, from which they are vented, under control of a vent valve 247 and via a line 248, to a suitable point in the heat recovery section of the apparatus, such as to the line 235. The contained steam comprises an effective means of recovering useful heat from the hot ash.

Ash slurry, from which gas bubbles have been largely disengaged, leaves the deaeration drum 246 via a line 249 and the fuel slurry preheat exchanger 204, indirectly transferring therein a portion of its sensible heat to fuel slurry on its way to the air-slurry mixer 206. (If the quantity of ash, and consequently ash slurry, is small the exchanger 204 may not be economically justified and, therefore, omitted.)

The level in the drum 246 is controlled, and proper pressure in the ash slurrying and cooling apparatus maintained, by a pressure reducing device 250, which discharges depressured, cooled ash slurry through a line 251 to suitable off-site disposal.

The gas-steam mixture separated from fines slurry in the zone 238 passes through one or more cooling and washing elements or trays 240 to the uppermost of which is directed a flow of clean water through a line 252. The water flowing downward through the elements 240 washes any entrained slurry from the gas-steam mixture and, supplemented by condensation of a portion of the steam, supplies sufficient dilution and cooling to the fines slurry leaving via the pump 242. Condensation of contained steam results in highly effective removal of particulates from the gas-steam mixture.

Washed gas-steam mixture leaves the separator 238 through an entrainment separator 253 on its way to the reheat exchanger 234, in which it is heated by indirect exchange to a temperature approaching that of hot combustion products in the line 233. The reheated gas-steam mixture flows through a line 254 to the inlet of a first stage turbine 255.

In the turbine 255 the gas-steam mixture is expanded to a pressure which produces sufficient mechanical energy, in the form of shaft horsepower, to drive the first stage air compressor 210 and the second stage air compressor 216 to which it is coupled. Having been cooled by giving up energy in the turbine 255, the partially expanded gas-steam mixture flows through a crossover 256 to a second stage turbine 257 in which it is further expanded to a pressure only nominally above atmospheric into a conduit 258. Mechanical energy produced by the expansion in the turbine 257 is transmitted, in the form of shaft horsepower, to a generator 259 which converts it into electricity which is delivered from the apparatus through a conduit 260 as a principal energy product of the combustion.

Because the temperature to which the gas-steam mixture can be reheated may, in some cases, be limited by allowable stresses in heat transfer surface, it may desirable to divide the reheat duty between the exchanger 234 and a second stage reheat exchanger (not shown) in the crossover 256, the two reheat exchangers being arranged in parallel with respect to combustion products in the line 233.

Boiler feedwater is brought into the apparatus through a line 261 and is given sufficient pressure by a boiler feedwater pump 262 to flow through a line 263, the cold side of compressor intercooler 212, a line 264, a control valve 265 and a line 266 to the convection section of a Heat Recovery Steam Generator (HRSG) 267. The function of the HRSG 267 (which may be a package-type unit available from one of several boiler manufacturers, comprising feedwater preheat, steam generation and superheating sections) is to recover sensible heat in the gas-steam mixture exhausted through the line 258.

(For simplicity of illustration, the HRSG 267 is shown as producing steam at only a single pressure. In the interests of maximum recovery of sensible heat in exhaust gases, it is not unusual for such a package unit to be equipped to generate steam at two or three pressure levels. Steam at intermediate pressure might, for example, be utilized by injecting it into the crossover 256, and steam at low pressure used for site heating services, feedwater treating, etc.)

The pump 262 and the intercooler 212 are also shown to be supplying heated water to the line 252 and the washing elements 240 through a line 268 and a valve 269, although clean water (preferably heated) from any available source could be substituted.

Depending upon the energy mix desired at the site, steam generated in the HRSG 267 may be directed back to the combustion through a line 270 and valves 271, 272 and/or 273 (which increases the production of electricity in the generator 259), or to other site facilities through a valve 274 and a line 275, or to a combination of both uses. For a given combustion temperature, steam injection decreases the requirement for injection of water or aqueous waste.

Feedwater at or near boiling point may also be withdrawn from the boiler drum of the HRSG 267 through a valve 276 and conducted via a line 277 to be injected for purposes of combustion temperature control into the reaction tube 220 through the valves 278, 279 and/ or 280. Withdrawal of water in this manner serves as boiler blowdown and, if of sufficient quantity, permits a relaxation of feedwater specifications.

Water for purposes of reactor temperature control (injection water) is supplied from offsite through a line 281 and is given sufficient pressure by a pump 282 to cause it to flow through a line 283 to an economizer exchanger 284 in which it is heated by indirect exchange with gas-steam mixture exhausted from the HRSG 267. Although illustrated as a separate exchanger, the economizer 284 is preferably comprised of a portion of the convection surface built into the HRSG 267.

Injection water does not have to be of boiler feedwater quality, in fact may be waste water or aqueous waste. Where a raw waste slurry is concentrated by carbonization, as in the unit 103 of FIG. 1, any surplus of freed water (shown being recycled through the line 104) may be utilized as injection water. Combustible impurities in it burn, along with the primary fuel, in the reaction tube 220 while non-combustibles join with the ash. On the other hand, if only good quality water is available, it may be unnecessary to keep feedwater and injection water separate, as shown in this embodiment.

The heated injection water is discharged through a line 285 as required to control the temperature in the reaction tube 220, as described in connection with feedwater withdrawn from the HRSG 267. This function would normally be served by the less valuable injection water up to the amount available, with any additional cooling requirement satisfied by feedwater.

After final recovery of heat in the economizer 284, the gas-steam mixture is discharged to the atmosphere through a vent 286. To minimize the visible plume and/or recover distilled water, the discharge may be processed by known water recovery methods.

To maximize the production of electricity per unit of fuel burned it is necessary to employ a relatively high turbine inlet, and therefore combustion, temperature. Because of the low sulfur content of most wastes, the alkali added to the fuel slurry and the pressure of the combustion, such combustion temperatures do not normally result in excessive emissions of sulfur oxides. However, formation of nitrogen oxides, in spite of the water content of the fuel slurry, staged introduction of air and injection of water and/or steam, may become higher than desired or permitted. In such case, this pollutant may be reduced by reaction with a scavenging agent, such as ammonia or urea, introduced (in a suitable carrier) through a line 287 and a control device 288. With combustion temperatures up to about 2000 degrees F., the agent may be injected into the line 233 as shown; with higher temperatures it is preferable to move the injection to an intermediate point in the hot side of the exchanger 234, where the temperature of combustion products is in the range of about 1600 to 2000 degrees.

If there is a strong advantage to producing ash dry instead of wet, it may be directed, instead of to the eductor 244, to conventional means of depressurizing pressurized solids, such as a plurality of lock hoppers. In such case the production of fines slurry would be curtailed by operating the separating zone 239 at an increased temperature.

With reference to FIG. 3, an aqueous waste containing combustible organic impurities is charged through a line 301 to a pressurized combustion apparatus. Alkali, at least sufficient to neutralize acids formed during the combustion, is charged through a line 302 to mix with the incoming waste in the line 301. In some cases, supplemental fuel, which may be a waste higher in heating value than that in the line 301, is charged through a line 303 and a valve 304 to join the alkalized waste in a line 305, which conveys the combined charge to the suction of a charge pump 306.

The pump 306 discharges the combined charge at sufficient pressure to cause it to flow through a line 307 to a vaporizor exchanger 308 in which indirect transfer of latent heat from condensing purified water vapor and sensible heat from the condensate raises its temperature and vaporizes most of its water content. (The exchanger 308 may, in fact, comprise two or more sections, one of which is devoted to exchange of sensible heat; another primarily to exchange of latent heat.)

The partially vaporized charge flows via a line 309 to a vapor-liquid separator 310 in which gravity causes the heavier liquid or slurry phase to separate from the vapor and collect in the lower section. The separated vapor passes through a mist extractor 311 and then flows through a line 312 to a superheat exchanger 313. In the exchanger 313 the vapor is superheated by indirect exchange with hot combustion products before flowing, via a line 314 to a charge-oxidant mixer 315.

The liquid or slurry, separated from the vapor in the separator 310, is boosted in pressure by a pump 316 and directed to the mixer 315 through a line 317. In the mixer 315, it is subjected to the influences of relatively high temperature and low partial pressure, which partially or completely vaporizes it and disperses any unvaporized droplets and/or particles in the vapor stream. However, static or mechanical means of dispersion or atomization may be employed in cases where portions of the liquid or slurry are viscous and/or high boiling.

Also charged to the mixer 315 is a pressurized oxygen-containing gas (oxidant), entering the apparatus through a line 318 and a control device 319. Alternatively, all or part of the oxidant may be directed through a valve 320 to join with the vapor in the line 312, being preheated, along with the vapor, by indirect exchange in the exchanger 313. In such case, combustion of low boiling organic compounds in the vapor may occur in the exchanger 313 and connecting lines.

An alternative means of bringing supplemental fuel into the apparatus is a line controlled by a valve 321. This provision is useful for bringing the apparatus up to temperature from a cold start and/or when the supplemental fuel is a gas or liquid not miscible with the aqueous waste.

From the mixer 315, the mixture of vaporized, or predominantly vaporized, waste, supplemental fuel (if present) and oxidant flows to a reactor 322 in which time is provided for the essential completion of oxidation reactions. The diameter of the reactor is preferably chosen to provide a relatively high velocity, such that solid particles and any unvaporized liquid droplets remain entrained in, and flow with, the gaseous phase.

Liberation of the heat of combustion of combustible waste matter and any added fuel, during passage through the reactor 322, results in an increase in temperature. The mass velocity of the mixture leaving the mixer 315 may be employed to induce a recycle of hot reaction products back to the inlet zone through an external recycle connection (not shown).

The reactor effluent, comprising essentially superheated water vapor and carbon dioxide and nitrogen from the oxidant, plus any liberated from nitrogen-containing compounds in the waste, and non-combustibles charged to the apparatus or resulting from oxidation or neutralization of acidic radicals, flows via a line 323 to the hot side of the exchanger 313.

After being cooled by indirect heat transfer in the exchanger 313, the effluent, still somewhat superheated, flows via a line 324 to a quench mixer 325, illustrated as, but not necessarily of, venturi type, in which it is cooled below its dewpoint, and solid products scrubbed from it, by direct contact with recirculated cooled condensate from a line 326. Uncondensed vapor, plus net and recirculated condensate, carrying dissolved and slurried non-combustible solids, flow together through a line 327 to a salt and ash separator 328.

In the separator 328 gravity causes the heavier liquid phase (brine) to separate from uncondensed vapor and collect in the lower section, from which the net production is withdrawn from the apparatus through a valve 329. The portion to be recirculated flows via a line 330 to a quench pump 331 which provides the pressure necessary to recirculate the brine, via a line 332, through the hot side of a quench boiler 333 and the line 326 to the mixer 325.

In the boiler 333 sufficient heat is indirectly transferred to boiling feedwater to cool the recirculated brine enough so that it, in turn, can quench the partially desuperheated reactor effluent to a temperature which results in the condensation therefrom of sufficient water to adequately carry the net production of ash, salts and excess alkali from the apparatus.

The saturated vapor separated from the liquid phase in the separator 328 passes through a mist extractor 334, to purify it of entrained droplets, and then flows, via a line 335, to a booster compressor 336. The compressor 336 provides a sufficient increase in pressure to the vapor that, after flowing through a line 337 to the hot side of the exchanger 308, its condensing temperature is high enough to transfer heat to aqueous charge being vaporized on the cold side. Also shown is a line permitting vapor, if sufficiently pure, to bypass the combustion, from the line 312 to the compressor 336.

After being largely condensed in the exchanger 308, the purified water and uncondensed gases flow via a line 338 to a high pressure separator 339, in which gravity causes the water to separate and collect in the lower section. Uncondensed gases (which, particularly in the case of the oxidant being air, may be termed flue gas) are released to the atmosphere through a valve 340.

Should the pressure in the separator 339 and the quantity justify, the flue gas may be expanded through a turbine (not shown), preferably after being reheated by indirect exchange (not shown) with hot combustion products as in the lines 323 or 324. The energy so recovered may be applied to compressing or pumping the oxidant, pumping the combined charge and/or generating electricity.

The production of purified water, still containing some dissolved gases, is let down in pressure to near atmospheric through a control device 341. A low pressure separator 342 is shown separating most of these gases and releasing them to the atmosphere through a vent 343, product water being discharged from the apparatus through a control device 344. In actual practice, the conduit or storage tank to which the product water is directed may serve adequately to separate the dissolved gases so that the separator 342 and associated items may be omitted.

Boiler feedwater is charged to the apparatus, under pressure from an off-site pump, through a line 345, which may contain a feedwater preheat exchanger (not shown) in which it is heated by indirect exchange as with the stream in the line 338. The pressurized feedwater mixes with recirculated feedwater from a line 346, the combined stream comprising, via a line 347, the cold side input to the quench boiler 333. In the boiler 333 indirect transfer of heat from recirculated condensate vaporizes part of the incoming feedwater. The resulting steam-water mixture flows, via a line 348, to a steam drum 349. In the drum 349 gravity causes the water to separate from steam and recirculate, via the line 346, to the point of mixing with incoming feedwater. Steam separated from water leaves the drum 349 via a mist extractor 350, to free it from entrained droplets, before leaving the apparatus through a line 351. If desired, and energy balance permits, the saturated steam in the line 351 may be superheated by indirect exchange with hot reactor effluent, as in the lines 323 or 324, before leaving the apparatus.

Dissolved solids brought into the apparatus with the cold feedwater tend to accumulate in the water in the drum 349 and have to be purged from the system through a blowdown connection (not shown).

The reactor 322 is preferably a length of pipe or tubing of material suitable for design temperature and pressure, having sufficient volume to provide the required reaction time. It may have an insulating refractory lining to protect the metal of the shell from full reaction temperature. It may be straight, a U-tube as shown, a plurality of U-tubes in series or arranged as a coil. It may comprise a plurality of tubes in parallel. It is also possible, in some instances, to combine the functions of the reactor 322 and the exchanger 313.

With some waste waters of low inorganic content it is possible to simplify the apparatus by replacing the eductor 325, the pump 331 and the boiler 333, as well as the connecting lines 326, 330 and 332, with a "waste heat boiler" transferring heat indirectly from the desuperheated reactor effluent (line 324).

The function of the boiler 333 (or replacement waste heat boiler) is to balance heat output with heat input by converting excess heat of combustion to a useful product, viz. steam. Of course, the excess heat could have been delivered, by means of an appropriate exchanger, in another form, such as process heat or hot water. In theory, the heating value of the combined charge could by so low that the duty of the boiler 333 would be zero and, therefore, it could be omitted. In practice, it is desirable for the charge to have sufficient heating value that there is at least a small excess of heat through which to exercise control over system heat balance. In case the excess is insufficient to justify the expense and complication of steam generation, or other recovery, it may be discarded, by means of a suitable cooler, to the atmosphere or a cooling water system.

At charge heating values near the minimum, heat may be conserved within the system by indirectly transferring the excess in desuperheated reactor effluent (line 324) to waste water preheat.

With reference to FIG. 4, an aqueous waste from which water of acceptable quality can be separated by distillation, is charged through a line 401 to a pressurized combustion apparatus. Alkali, at least sufficient to neutralize acids formed during the combustion, may be charged through a line 402 to mix with the incoming waste in the line 401. (An alternative location for alkali addition is concentrated waste in the line 416 or the line 418.)

The charge pump 403 provides the alkalized charge with sufficient pressure to cause it to flow through the cold sides of a condenser 404, a cooler 405, a first stage vaporizer 406 into a first stage flash drum 407. In the condenser 404 the waste is heated by indirect exchange with condensing second stage flash steam, in the cooler 405 with hot combustion condensate and in the vaporizer 406 it is partially vaporized by indirect exchange with gaseous combustion products, much of the heat deriving from the condensation (at higher pressure) of contained water vapor. In the drum 407 the vaporized water (first stage flash steam) is separated from unvaporized waste and flows via a line 408 to the hot side of a condenser-evaporator 409 in which it is condensed to liquid water by indirect exchange with partially concentrated waste, boiling at a reduced pressure. The first stage condensate leaves the condenser-evaporator 409 through a line 410.

The partially concentrated waste leaves the drum 407 through a pressure reducing valve 411 and flows through a line 412 to the hot side of the condenser-evaporator 409 in which transfer of heat from condensing first stage flash steam vaporizes an additional portion of the water in the waste, the vapor-liquid mixture being discharged into a second stage flash drum 413. In the drum 413 the vaporized water (second stage flash steam) is separated from concentrated waste and flows via a line 414 to the hot side of the condenser 404 in which it is condensed to purified liquid water product by indirect exchange with cold incoming waste. The purified water leaves the condenser 404 through a line 415.

The vaporizer 406 and the flash drum 407 may be combined into an integral "evaporator"; similarly the condenser-evaporator 409 may be combined with the flash drum 413. Two stages (or "effects") of evaporation are shown; triple-effect, or even quadruple-effect evaporation might be economically justified in some circumstances. Although, as illustrated, the flash drum 413 would operate at a pressure slightly above atmospheric, if the waste is temperature sensitive, the last effect (or effects) could readily be designed to operate at subatmospheric pressure, utilizing established vacuum condensing equipment and procedures.

From the bottom of the drum 413 the concentrated waste flows via a line 416 to a reactor charge pump 417 which gives it sufficient pressure to cause it to flow through a line 418, the cold side of a reactor in-out exchanger 419 and through a line 420 to an oxidant-waste mixer 421. In the exchanger 419 the concentrated waste is largely vaporized and superheated by indirect exchange with hot reactor effluent. An oxidant (air, enriched air or oxygen), under sufficient pressure from a compressor or pump not shown, is intimately mixed with the waste in the mixer 421. Static or mechanical means of dispersion or atomization may be employed in cases where portions of the liquid or slurry are viscous and/or high boiling.

When starting up the apparatus from a cold start it is necessary to bring supplemental gaseous or liquid fuel into the mixer by means of a line 423 and a control device 424. At such times it is also necessary to make use of an ignition device (not shown), which may be retractable, immediately downstream of the mixer 421. With lean wastes it may be desirable or necessary, for the attainment of a suitable combustion temperature, to inject a small amount of supplemental fuel continuously.

Alternatively, the oxidant may be directed, by means of a connection not shown, to join with the vapor in the line 418, being preheated, along with the vapor, by indirect exchange in the exchanger 419. In such case, combustion of some of the more reactive combustible contaminants may occur in the exchanger 419 and the line 420.

From the mixer 421, the mixture of vaporized, or predominantly vaporized, waste, supplemental fuel (if present) and oxidant flows to a reactor 425 in which time is provided for the essential completion of oxidation reactions. The diameter of the reactor is preferably chosen to provide a relatively high velocity, such that solid particles and any unvaporized liquid droplets remain entrained in, and flow with, the gaseous phase.

The kinetic energy of the materials discharged from the mixer 421 may be employed to induce a recycle of hot combustion products through a recycle connection 426, resulting in an increased temperature, and consequently a higher reaction rate, in the inlet zone of the reactor 425.

Liberation of the heat of combustion of combustible waste matter and any added fuel, during passage through the reactor 425, results in an increase in temperature. The reactor effluent, comprising essentially superheated water vapor, carbon dioxide and nitrogen from the oxidant, plus any liberated from nitrogen containing compounds in the waste, and non-combustibles charged to the apparatus or resulting from oxidation or neutralization of acidic radicals, flows to the hot side of a waste heat boiler 427 in which a portion of its sensible heat is transferred to boiling feedwater.

The duty of the boiler 427 may vary from zero, with very dilute wastes, to a considerable amount with more concentrated ones. When the heating value of the waste does not justify the boiler 427 it may, of course, be omitted. It is considered, however, a desirable means in most cases of adjusting the system to varying waste properties.

From the hot side outlet of the boiler 427 the reactor effluent flows to the hot side of the in-out exchanger 419 in which it is cooled to a temperature slightly below its dewpoint by indirect exchange with incoming waste concentrate. The small amount of water condensed in the exchanger 419 serves to collect into an aqueous phase (or brine) noncombustibles in the waste, excess alkali and salts formed during the combustion.

Uncondensed effluent, together with the brine, flow to a brine separator drum 428 in which gravity causes the brine to separate and collect in the bottom, from which it is withdrawn through a level control means 429 and discharged from the apparatus through a line 430. In order to keep the exchanger 419 free of solid deposits, some of the brine may be recirculated to its hot side inlet, or a suitable intermediate point, by means of a pump and line not shown.

The vapor phase separated in the drum 428, comprising steam and gaseous products of combustion, flows via a line 431 to the hot side of the first stage vaporizer 406 in which most of the steam is condensed to liquid water by indirect heat exchange with waste boiling at a lower pressure. Water and gaseous combustion products flow from the vaporizer to a flue gas separator drum 432 in which the gaseous products, containing an equilibrium concentration of steam, are vented through a back pressure control means 433 and a vent stack 434 to the atmosphere.

In the drum 432 gravity causes the heavier water phase to separate from flue gas and collect in the lower section, from which it is withdrawn through a line 435 to the hot side of the exchanger 405, in which it is partially cooled by indirect exchange with partially heated waste and then discharged into a line 436 in which it joins with first stage flash distillate from the line 410. The combined water flows to the hot side of a boiler feedwater exchanger 437 in which it is cooled by indirect exchange with incoming feedwater before joining the second stage flash condensate from the line 415 in a line 438, to be discharged from the apparatus as the purified water product of the process.

Boiler feedwater is charged to the apparatus, under pressure from an off-site pump, through a line 439, to the cold side of the exchanger 437 in which it is heated by indirect transfer from product water. The heated feedwater then flows through a line 440 (in which it may receive further preheat from other sources of low level heat locally available, not shown) to a feedwater accumulator 441 (which may be a "deareator" of proprietary design) in which gases liberated by the heating are vented through a pressure control means 442.

A boiler feedwater pump 443 takes suction from the accumulator 441 and provides sufficient pressure to cause the preheated feedwater to flow via a line 443 to mix with feedwater recirculated from a steam drum 446 through a line 445, the combined stream comprising the cold side input to the waste heat boiler 427. In the boiler 427 indirect transfer of heat from reactor effluent vaporizes part of the incoming feedwater. The resulting steam-water mixture flows, via a line 447, to the drum 446. In the drum 446 gravity causes the water to separate from steam and recirculate, via the line 445, to the point of mixing with incoming feedwater. Steam separated from water leaves the drum 446 via a mist extractor 448, to free it from entrained droplets, before leaving the apparatus through a line 449. If desired, and energy balance permits, the saturated steam in the line 449 may be superheated by indirect exchange with hot reactor effluent in a superheat exchanger (not shown) in the line between the reactor 425 and the boiler 427.

Dissolved solids brought into the apparatus with the cold feedwater tend to accumulate in the water in the drum 446 and have to be purged from the system through a blowdown connection (not shown).

The reactor 425 is preferably a length of pipe or tubing of material suitable for design temperature and pressure, having sufficient volume to provide the required reaction time. It may have an insulating refractory lining to protect the metal of the shell from full reaction temperature. It may be straight, a U-tube as shown, a plurality of U-tubes in series or arranged as a coil. It may comprise a plurality of tubes in parallel. It is also possible, in some instances, to combine the functions of the reactor 425 and the exchanger 419.

The function of the boiler 427 is to balance heat output with heat input by converting excess heat of combustion to a useful product, viz. steam. Of course, the excess heat could have been delivered, by means of an appropriate exchanger, in another form, such as process heat or hot water. In practice, it is desirable for the charge to have sufficient heating value that there is at least a small excess of heat through which to exercise control over combustion temperature. In case the excess is insufficient to justify the expense and complication of steam generation, or other recovery, it may be discarded, by means of a suitable cooler, to the atmosphere or a cooling water system.

In embodiments similar in principle to that of FIG. 4 the aqueous waste would be concentrated by one of the alternative techniques of multistage flash distillation or vapor recompression evaporation, instead of multiple effect evaporation. The net heat required for the concentration would, as in FIG. 4., be provided by the pressurized combustion of the concentrated waste.

DESCRIPTION OF THE INVENTION

The parent case, application Ser. No. 813,486 (U.S. Pat.No. 4,714,032) and my U.S. Pat. Nos. 4,377,066 (A) and 4,380,960 (B) describe methods of burning carbonaceous fuels under pressure in the presence of water vapor and alkali. Pressure, water and alkali promote combustion so that essentially complete carbon conversion can be achieved at temperatures lower than normally employed in atmospheric boilers. These conditions, including reduced temperature, combine in direct the chemistry of sulfur compounds in the fuel almost quantitatively to alkali sulfate, virtually eliminating sulfur dioxide from the flue gas. As is well known, reduction in temperature also decreases the formation of nitrogen oxides so that both gaseous pollutants considered responsible for acid rain are effectively controlled.

Pressure also decreases the volume of gases to be processed and improves heat transfer coefficients, so that equipment is reduced in size and cost. It has the further desirable effect of increasing the dewpoint of combustion products and the temperature level at which latent heat can be recovered and utilized. Condensation of water during heat recovery, on and around particles of ash and other solid products, wets them and effectively removes them from the flue gas. This action eliminates from the flue gas the third major pollutant, "particulates".

These combustions are "wet" in the sense that solid fuels are charged as aqueous slurries, and additional water may be injected into the combustion zone to control its temperature. Also, during heat recovery, water vapor in combustion products condenses to liquid water, permitting a thorough wet cleansing of the flue gas. In all embodiments, combustion temperature is predominantly or entirely above the critical temperature of water (705.4 degrees F.), hence supercritical with respect to temperature. When pressure is subcritical (below about 3200 psi), as in the subject embodiments, water in the combustion zone is technically "superheated vapor" and the process may be termed "Vapor Phase Wet Combustion".

I have discovered that solid and liquid wastes can be effectively treated by vapor phase wet combustion and that utilization and/or recovery of energy is more efficient than in the art currently practiced. In this field, the combustible content, although predominantly carbonaceous (having a molecular skeleton of carbon atoms) is usually described as "organic" (having its origin in living matter). To minimize confusion, I will refer to these constituents as "combustible".

The embodiments of FIGS. 1 and 2 are directed toward the more concentrated wastes which have sufficient combustible content to justify recovery of useful energy. This category embraces most solid and the more concentrated liquid wastes. The embodiments of FIGS. 3 and 4 are directed to relatively dilute liquid wastes, for which the primary objective is purification from combustible contaminants rather than recovery of energy.

Most wastes are hydrophilic, containing much bound water which cannot be separated from solid components by physical means. In many cases it is advantageous to preheat such wastes, in liquid or slurry form, to a temperature at which molecular rearrangement occurs (carbonization), freeing a considerable part of the bound water, so that a physical separation becomes possible. The heating value of the concentrated waste is improved so that, upon combustion in an embodiment such as FIG. 1 or 2, it yields more exportable energy. The separated water may be allowed to by-pass the combustion. Since it may contain an appreciable concentration of soluble organic compounds, preferred dispositions are recycling to the slurrying of raw waste and, in water injection embodiments, control of combustion temperature. Should there be a surplus of the freed water, it may be treated to effluent specifications in a second combustion system, according to the embodiments of FIG. 3 or 4, parts of which may be combined with the corresponding parts of the combustion system for the concentrated waste.

The reactor embodiments described and illustrated in this application, and FIG. 2 of the parent case, burn combustible constituents in entrained phase, i.e., while suspended in a gaseous phase of steam and air. This is not intended to exclude reactor embodiments which utilize fluidized beds, either "bubbling bed" or circulating, such as that of FIG. 1 of the parent case. An embodiment for exclusively charging aqueous waste, which normally contains little non-combustible material, would preferably specify an entrained phase combustor. On the other hand, if it were contemplated to supplement the aqueous waste, regularly or at times, with ash-containing solid fuel, a fluidized bed reactor embodiment, as illustrated in FIG. 1 of the parent case, might be preferred. Initially, it would be charged with extraneous ash or other fine solids.

Since we are dealing in this application with fuels of relatively high water content, achieving a satisfactorily high reactor inlet zone temperature is a pervasive necessity. In some cases it is possible to do so with substantial preheat of waste feed and/or combustion air. I consider it preferable to obtain the desired inlet zone temperature by recycling hot combustion products. In the case of circulating fluidized bed reactors, a recycle of solid products performs this function. In the case of the illustrated entrained phase embodiments, it is performed by recycle of totally or mainly gaseous products.

FIG. 1 diagrams an embodiment utilizing the heat transfer method of reactor temperature control ("heat transfer embodiments"). The embodiments of FIG. 1 of the parent case and FIG. 5 of Patent A and FIG. 6 of Patent B also rely on this method. The "by-product" of low pressure steam (or process heat) frequently fits in well where there is a local heating demand.

The embodiments of FIG. 2 of this application, FIG. 1 of the parent case, FIG. 2 of application Ser. No. 813,486, as well as FIG. 1 of Patent A and FIGS. 1 and 2 of Patent B rely, on the other hand, on the injection of water to control combustion temperature ("water injection embodiments").

FIG. 1 can be further categorized as a "boiler embodiment", i.e., the energy product is primarily high pressure steam (usually superheated), which can be converted (offsite) to electricity in a conventional condensing turbo-generator. FIG. 2, on the other hand, is a "gas turbine embodiment" in which electricity is produced onsite as the primary energy product. From the standpoint of internal energy exchange, they differ in that combustion products are cooled, in boiler embodiments, to a temperature which condenses most of the contained steam whereas, in gas turbine embodiments, they are cooled only slightly below their dewpoint, the preponderance of the contained steam being applied to increasing the heat and mass flow to the turbines. This steam is consequently discharged with flue gas to the atmosphere.

As described in application Ser. No. 813,486, the parent case and in Cols. 28 and 29 of Patent B, the internal water distillation cycle of a boiler embodiment can be utilized to purify extraneous water. Any water of poor quality, such as an aqueous waste, is merely substituted for that which would have been recycled internally (utilizing appropriate heat exchange for economy).

In embodiment charging relatively concentrated wastes, the designer must be aware of the necessity for avoiding excessive combustion temperatures. On the other hand, with dilute waste waters, care must be taken in design and operation to conserve heat within the apparatus so as to attain an adequately high combustion temperature. Because such contaminants usually oxidize readily, waste destructions in excess of 99 percent can usually be achieved with combustion temperatures of the order of 1100-1300 degrees F. For more complete destruction of toxic constituents or intermediates, the required temperature may be as high as 1500 or 1600 degrees. In gas turbine embodiments, however, thermal efficiency within allowable metal stresses, rather than waste destruction, will usually determine combustion temperature.

Since the flue gas discharged from a combustion apparatus is a major source of heat loss, its quantity and heat capacity may be minimized by substituting commercial oxygen for combustion air. In this way heat is conserved so that more dilute waste waters can be purified. Substitution of oxygen for air also improves the level at which latent heat can be recovered. Furthermore, the cost of pumping or compressing the oxidant to combustion pressure is reduced and pressure equipment is smaller.

Even when the heating value of a waste water is inadequate, of itself, to sustain a sufficiently high combustion temperature, it may be purified according to my invention by adding supplemental fuel, which may be of low or unmarketable quality. In fact, aqueous waste and supplemental fuel may be charged in any proportion, up to the most concentrated slurry that can be pumped into the apparatus. The higher the heating value of the waste water-fuel combination, the larger is the production of exportable energy. When the supplemental fuel is a nonaqueous gas or liquid, it may be compressed or pumped into the reaction system separately from the aqueous waste.

RDF slurry from a wet-type resource recovery process, dewatered to about the maximum pumpable solids concentration, is a very suitable fuel. Dry process RDFs would normally be comminuted so as to form a fluid or semi-fluid slurry with recycled water and/or aqueous waste, which can be pumped to the required pressure. Alternatively, solid or semi-solid fuels may be pressurized by means of lock hoppers or such mechanical means as rams or extruders.

In addition to its role in promoting oxidation of combustible materials, alkali is usually added for the purpose of neutralizing sulfuric or other acids to which elements, such as phosphorus and the halogens, may be converted. With embodiments employing relatively high combustion temperatures, particularly gas turbine embodiments, an agent for raising the softening and/or melting point of the ash may also be added.

Charge slurries containing substantial proportions of solids are usually preheated and charged to the combustion reactor in liquid phase. With low heating value aqueous wastes, on the other hand, it is frequently desirable or necessary, in the interest of heat conservation, to vaporize, and even superheat, most of the charge to the reactor.

Some aqueous wastes contain contaminants which boil at a temperature lower than water. These are generally thermally stable and may be vaporized, along with the bulk of the water, without difficulty (FIG. 3). Higher molecular weight contaminants, whose boiling points are above water's are frequently unstable and liable to form deposits on heat transfer surface if one were to attempt to vaporize them. It is preferable, therefore, to discontinue the vaporization while essentially all of the unstable, high boiling constituents remain in liquid (or, in some cases, slurry) phase. The residual liquid is then separated and pumped directly to the oxidant mixer without further heating.

Vapor (predominantly steam) separated from the residual contaminents can, in most cases, be superheated by exchange with combustion products before mixing with oxidant.

Pressurized oxidant (air, enriched air or oxygen) may be mixed with superheated vapor and residual liquid at the inlet of the combustion reactor. Depending upon the properties and water content of the liquid (or slurry), it may be desirable to use a dispersion device to insure its even distribution and mixing with oxidant and vapor. Under the influences of heat, dilution and oxidation, droplets rapidly form an essentially homogenous mixture with the gaseous reactants. Oxidation is essentially complete within a few seconds.

Alternatively, the oxidant may join and be superheated in admixture with the vapor, so as to increase the heat input and, hence, the maximum temperature attainable in the combustion. In such case, low boiling combustibles in the vapor may be partially or completely oxidized before reaching the reactor. It is also possible, by specifying a special type of exchanger, such as a double-pipe design, with appropriate provision for injecting unvaporized charge (if any), to combine the functions of superheat exchanger and reactor.

There is a minimum heating value, below which an adequate combustion temperature cannot be reached (without supplemental fuel). This minimum is affected by the efficiency of heat recovery but would usually be about 100–300 Btu/Lb., corresponding to a combustible content of about 1–3 percent.

Non-combustible constituents contained in the aqueous waste (and supplemental fuel, if any), and alkali added thereto, although possibly altered during the combustion, remain in combustion products in the form of ash, oxides or salts. Although some may be separated dry, unseparated fine particles and vaporized salts are collected in the first water to be condensed during heat recovery and are conveniently separated in concentrated form and removed from the apparatus for disposal. If comprised mainly of insoluble compounds it would be called "ash slurry"; if they are mainly soluble, "brine". (The non-combustible content of some aqueous wastes is low enough that this step may be omitted.)

The balance of the product vapor is then condensed to a relatively pure water suitable, after separation of dissolved gases, for most industrial purposes, or plant effluent. While sensible heat may readily be exchanged, in a conventional manner, between incoming waste water and outgoing purified water, in both liquid and vapor states, recovery of latent heat (a substantial part of the total to be exchanged) is less straightforward.

Heat for vaporizing water in the feed tends to be required at a temperature higher than it is available from condensing water vapor in combustion products. That is because pressure in the heat recovery system is normally lower, because of pressure drop in the apparatus, than in the feed system. For example, at a feed system pressure of 535 psig, pure water vaporizes at a temperature of 477 degrees F. whereas, allowing for a 5% loss in pressure, it would condense at about 472 degrees. Heat will not flow to a zone of higher temperature. The negative temperature difference is further aggravated, in actual cases, by the presence of noncondensible gases (particularly when the oxidant is air).

I have discovered that a positive difference between temperature of condensation and temperature of vaporization may be established, even in the presence of noncondensible gases, by increasing the condensing pressure moderately by means of a pressure increasing device, such as a booster compressor. In the previous pure water example, an increase in pressure of 100 psi ( a compression ratio of about 1.2) would result in a condensing temperature of about 490 degrees, providing a positive temperature difference of 13 degrees. The embodiment of FIG. 3 illustrates this concept.

While a booster compressor does consume some horsepower, its equivalent in heat is added to that available for transfer to incoming aqueous waste. If the scale of the operation justifies, this horsepower may be obtained from a turbine expanding the vent gas, preferably after reheating by exchange with hot reaction products.

FIG. 4 illustrates an embodiment applicable to dilute wastes whose contaminants are substantially less volatile than water. In other words, steam vaporized from the preheated waste water is sufficiently pure, after condensation, to meet product water specifications. It may, therefore, be condensed and discharged from the apparatus without further treatment. The latent heat of this steam may be utilized by indirect transfer to vaporize, at reduced pressure, additional water from the feed waste, or to do so through a series of vaporizers held at successively lower pressures (multiple effect evaporation).

Although not shown in FIG. 4, any low boiling contaminents may be stripped from the preheated aqueous waste (by use of known chemical engineering art) before the distillation operations, the uncondensed strippings and accompanying steam being conducted directly to the reactor inlet.

When taking advantage of aircraft-derived turbomachinery, gas turbine embodiments, such as FIG. 2, are limited in pressure by the compression ratios available. Machines currently produced are capable of delivering air from about 150 to about 480 psi. Industrial type turbomachinery, although less compact and efficient, can be assembled to support whatever combustion pressure is determined to be economically attractive. Although not necessarily optimum, studies show excellent economics for waste combustions in the range of 350–500 psi, an important capital and operating cost advantage over Wet Air Oxidation (which requires at least 2000 psi) and Supercritical Water Oxidation (which requires around 3700 psi).

My method of burning carbonaceous material from aqueous wastes differs from Wet Air Oxidation (WAO) in that it utilizes higher temperatures and lower pressures. At the higher temperatures, oxidation is several orders of magnitude faster and, therefore, much smaller reactors are required. Any surplus of heat is at a more valuable level. Water vapor is less corrosive at reaction temperatures, in the presence of oxygen and soluble salts, than liquid water. Reaction systems are, theefore, smaller, lighter and can be constructed of less expensive materials.

Another disadvantage of WAO is that both gaseous and liquid phases are present during the reaction, imposing an added resistance to rapid and complete conversion. Supercritical Water Oxidation (SCWO) avoids the latter difficulty by carrying out the reaction in a homogeneous dense phase. My invention enjoys a comparable advantage, the reaction medium being an essentially homogeneous vapor phase, as well as similarly rapid conversion, while normally employing much lower and more economical pressures (as, for example, 100–500 psi).

Having described my invention, I claim:

1. A pressurized combustion process in which an aqueous waste is mixed with recycled combustion products and an oxygen-containing gas, and combustible constituents burned at supercritical temperature and subcritical pressure, with respect to water, net combustion products being cooled below their dewpoint at essentially combustion pressure, forming an aqueous slurry of non-combustible constituents and a wet flue gas.

2. A process as in claim 1 in which the alkali content of the aqueous waste is adjusted so that the aqueous slurry of non-combustible constituents has a pH of at least 7.

3. A process as in claim 2 in which the oxygen-containing gas initially mixed with the waste and the recycled combustion products provides less oxygen than theoretically required for the complete combustion of combustible constituents, the remainder required to provide a predetermined excess above theoretical being added in one or more increments downstream of the initial mixing.

4. A process as in claim 2 in which the net combustion products are, before cooling, subjected to a gas-solids separation.

5. A process as in claim 4 in which the solids separated from net combustion products are mixed with at least a portion of the aqueous slurry of non-combustible constituents to form an ash slurry, from which entrained gases are separated before depressuring and discharge from the apparatus.

6. A process as in claim 2 in which the combustion temperature is controlled below a predetermined maximum by the indirect transfer of heat to boiling feedwater, and the wet flue gas is further cooled to a temperature at which the preponderance of water vapor has been condensed therefrom, forming a clean condensate and a dry flue gas which is reheated by indirect exchange with net combustion products and expanded through turbines which produce mechanical energy.

7. A process as in claim 6 in which at least a portion of the clean condensate is re-used to prepare the slurry of aqueous waste.

8. A process as in claim 6 in which the temperature to which the dry flue gas is reheated is sufficient that the turbines produce as much mechanical energy as consumed by the compression of the oxygen-containing gas.

9. A process as in claim 2 in which the combustion temperature is controlled below a predetermined maximum by the injection of water or aqueous waste, and the wet flue gas is reheated by indirect exchange with net combustion products to an approach to combustion temperature and expanded through turbines which produce mechanical energy substantially in excess of that consumed by the compression of oxygen-containing gas, the excess being converted into electricity.

10. A process as in claim 9 in which a portion of the sensible heat remaining in the wet flue gas exhausted from the turbines is transferred to boiling feedwater, generating steam.

11. A process as in claim 10 in which at least a portion of the steam is injected into the combustion reactor.

12. A process as in claim 9 in which the turbines exhaust to a back pressure such that they produce only as much mechanical energy as consumed by the compression of the oxygen-containing gas, and the exhaust gases are directed to a hydrocarbon-containing underground formation.

13. A process as in claim 2 in which the aqueous waste is hydrophilic and, after preheating to a temperature in the range of 350–550 degrees F., is dewatered to form freed water and a concentrated slurry of carbonized waste which is mixed with the recycled combustion products and the oxygen-containing gas.

14. A process as in claim 13 in which at least a portion of the freed water is re-used to prepare the slurry of aqueous waste.

15. A process as in claim 2 in which a dilute aqueous waste is substantially vaporized, both vaporized and unvaporized portions being mixed with the recycled combustion products and the oxygen-containing gas and, after net combustion products are cooled below their dewpoint, wet flue gas is compressed sufficiently to provide a positive temperature difference for the indirect transfer of heat from the condensation and subcooling of a substantial portion of its water vapor to the preheating and substantial vaporization of the aqueous waste.

16. A process as in claim 15 in which a supplemental fuel is also mixed with the recycled combustion products and the oxygen-containing gas, in an amount sufficient to attain a predetermined combustion temperature.

17. A process as in claim 2 in which an aqueous waste is concentrated by multi-effect evaporation before being mixed with the recycled combustion products and the oxygen-containing gas, the heat for which is indirectly transferred from the condensation of water vapor in the wet flue gas.

18. A process as in claim 17 in which a supplemental fuel is also mixed with the recycled combustion products and the oxygen-containing gas, in an amount sufficient to attain a predetermined combustion temperature.

19. A process as in claim 2 in which an aqueous waste is concentrated by vapor recompression evaporation before being mixed with the recycled combustion products and the oxygen-containing gas, the heat for which is indirectly transferred from the condensation of water vapor in the wet flue gas.

20. A process as in claim 19 in which a supplemental fuel is also mixed with the recycled combustion products and the oxygen-containing gas, in an amount sufficient to attain a predetermined combustion temperature.

21. A process as in claim 2 in which an aqueous waste is concentrated by multiple-effect flash evaporation before being mixed with the recycled combustion products and the oxygen-containing gas, the heat for which is indirectly transferred from the condensation of water vapor in the wet flue gas.

22. A combination between a wet resources recovery and a slurry carbonization comprising the steps of:
    comminuting a Municipal Solid Waste and mixing it with water to form a dilute MSW slurry;
    subjecting the dilute MSW slurry to slurry-solids separations to recover therefrom particles of inorganic constituents, forming a dilute RDF slurry;
    dewatering the dilute RDF slurry to about a maximum pumpable concentration, forming a concentrated RDF slurry and primary recycle water;
    returning at least a portion of the primary recycle water to the slurrying of the comminuted Municipal Solid Waste;
    heating the concentrated RDF slurry under pressure to a temperature in the range of 350–550 degrees F., freeing formerly bound water and forming a hot slurry of carbonized RDF;
    dewatering the hot slurry of carbonized RDF to about a maximum pumpable concentration, forming a concentrated hot carbonized RDF slurry and freed hot water;
    returning at least a portion of the freed hot water to the slurrying of the comminuted Municipal Solid Waste;

23. A combination as in claim 22 and comprising the additional steps of:
    dewatering and drying the hot concentrated carbonized RDF slurry;
    densifying the dried carbonized RDF for utilization as a solid fuel.

24. A waste-to-energy process comprising a combination as in claim 22 and the additional steps of:
    adding an alkali to the concentrated hot carbonized RDF slurry;

mixing the concentrated alkalized hot carbonized RDF slurry with recycled combustion products and an oxygen-containing gas and burning combustible constituents at supercritical temperature and subcritical pressure, forming a slurry on non-combustible constituents, a clean condensate and a flue gas, the net heat of combustion being transferred to the generation of steam.

25. A waste-to-energy process comprising a combination as in claim 24 and the additional step of:
further comminuting the carbonized RDF in the alkalized hot carbonized RDF slurry before mixing with recycled combustion products and the oxygen-containing gas.

26. A process combination as in claim 24 in which the combustion temperature is controlled below a predetermined maximum by the injection of water or aqueous waste and the flue gas, after separation of the slurry of non-combustible constituents, is reheated by indirect exchange with hot combustion products and expanded through turbines which produce mechanical energy substantially in excess of that required to pressurize the oxygen-containing gas, the excess being converted into electricity.

* * * * *